United States Patent
Hwang

(10) Patent No.: US 10,527,166 B1
(45) Date of Patent: Jan. 7, 2020

(54) BELT PULLEY CONTROL METHOD FOR CONTINUOUSLY VARIABLE TRANSMISSION

(71) Applicants: Hyundai Motor Company, Seoul (KR); Kia Motors Corporation, Seoul (KR)

(72) Inventor: Jin Young Hwang, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/184,838

(22) Filed: Nov. 8, 2018

(30) Foreign Application Priority Data

Aug. 3, 2018 (KR) .......................... 10-2018-0090594

(51) Int. Cl.
*F16H 61/00* (2006.01)
*F16H 61/662* (2006.01)

(52) U.S. Cl.
CPC ....... *F16H 61/662* (2013.01); *F16H 61/0021* (2013.01); *F16H 2061/66218* (2013.01)

(58) Field of Classification Search
CPC ............... F16H 61/662; F16H 61/0021; F16H 2061/66218
See application file for complete search history.

(56) References Cited

U.S. PATENT DOCUMENTS

| | | | |
|---|---|---|---|
| 2003/0158646 A1* | 8/2003 | Nishida | F16H 61/66259 701/51 |
| 2016/0363218 A1* | 12/2016 | Sasaki | F16H 59/66 |
| 2017/0321802 A1* | 11/2017 | Takahashi | F16H 9/18 |
| 2018/0244284 A1* | 8/2018 | Amano | B60W 10/101 |

FOREIGN PATENT DOCUMENTS

| JP | 4951172 B2 | 6/2012 |
|---|---|---|
| JP | 4967527 B2 | 7/2012 |
| KR | 10-2012-0023444 A | 3/2012 |

* cited by examiner

*Primary Examiner* — David J Hlavka
(74) *Attorney, Agent, or Firm* — Morgan, Lewis & Bockius LLP

(57) ABSTRACT

A belt pulley control method of a continuously variable transmission may include setting, a controller, a permission change rate map by adding a predetermined margin to an output shaft rotation speed change rate of a normal road surface according to a high friction road condition; and controlling, the controller, a hydraulic pressure of the belt pulley to be raised when the output shaft rotation speed change rate of the current vehicle is equal to or greater than a set value of the permission change rate map.

9 Claims, 3 Drawing Sheets

BELT PULLEY CONTROL METHOD FOR CONTINUOUSLY VARIABLE TRANSMISSION

CROSS REFERENCE TO RELATED APPLICATION

The present application claims priority to Korean Patent Application No. 10-2018-0090594 filed on Aug. 3, 2018, in the Korean Intellectual Property Office, the entire contents of which is incorporated herein for all purposes by this reference.

BACKGROUND OF THE DISCLOSURE

Field of the Disclosure

The present invention relates to a belt pulley control method for a continuously variable transmission capable of improving the robustness against the impact applied to the belt pulley due to the sudden change of friction coefficient of the road surface to prevent the damage of a belt pulley and a transmission.

Description of Related Art

A continuously variable transmission (CVT) shifting by a belt pulley controls the pressures of a drive pulley and a driven pulley to produce the desired transmission ratio.

As a result, the shifting stage can be configured as an infinite shifting stage rather than a fixed shifting stage, so that the shifting stage can be optimized to higher engine efficiency as compared with a multi-shifting stage (planetary gear/external gear) transmission, making the fuel efficiency and performance of a vehicle excellent.

However, due to the structure that transmits the power by use of the belt, when disturbance such as sudden torque fluctuation coming from the axle, rough road and low friction, and the like occurs, sudden torque is transmitted to the belt so that the belt slips, which leads to a problem of transmission damage.

When the vehicle enters high friction road (asphalt, pavement) in a state that the wheel speed is raised by the condition of the wheel slip during the vehicle is running on a low friction road (such as a sandy or snow road), the rotation of the tire is sharply reduced (the same action as when the tire is locked) due to the friction coefficient change of the road surface, so that the impact generated by this is caught on the output shaft of the transmission.

As like this, the torque on the output shaft is transmitted to the transmission and directly affects the belt pulley, which causes damage to the pulley surface or damage to the belt, and finally induces a problem of a total failure of the transmission.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a belt pulley control method of a continuously variable transmission configured for improving the robustness against the impact applied to the belt pulley due to the sudden change of friction coefficient of the road surface to prevent the damage of a belt pulley and a transmission.

A belt pulley control method of a continuously variable transmission according to an exemplary embodiment of the present invention may include setting, a controller, a permission change rate map by adding a predetermined margin to an output shaft rotation speed change rate of a normal road surface according to a high friction road condition; and controlling, the controller, a hydraulic pressure of the belt pulley to be raised when the output shaft rotation speed change rate of the current vehicle is equal to or greater than a set value of the permission change rate map.

Controlling the raised hydraulic pressure of the belt pulley to return when the current output shaft rotation speed change rate falls equal to or lower than a lower limit value lower than the set value of the permission change rate map after the hydraulic pressure is raised, may be further included.

The lower limit value may be a value which is lowered by a predetermined value based on the set value of the permission change rate map.

The lower limit value may be a value which is lowered by a predetermined value based on the output shaft rotation speed change rate of the normal road surface.

Controlling the raised hydraulic pressure of the belt pulley to return when the current output shaft rotation speed change rate is maintained for a predetermined time period in a state of entering into a predetermined stabilization section including the output shaft rotation speed change rate of the normal road surface after the hydraulic pressure is raised, may be further included.

The stabilization section may be a section offset by a predetermined change rate based on the output shaft rotation speed change rate of the normal road surface.

In accordance with various aspects of the present invention through the above-mentioned problem solving means, by detecting sudden friction coefficient fluctuation of the road surface by change level of the rotation speed change ratio of the output shaft to control the hydraulic pressure of the belt pulley to be raised, it is possible to improve the robustness against the impact applied to the belt pulley, which prevents the damage of the belt pulley and transmission to ensure the reliability of the transmission products and obtains an effect of further reducing the transmission quality problem in the region where the road surface condition is poor.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
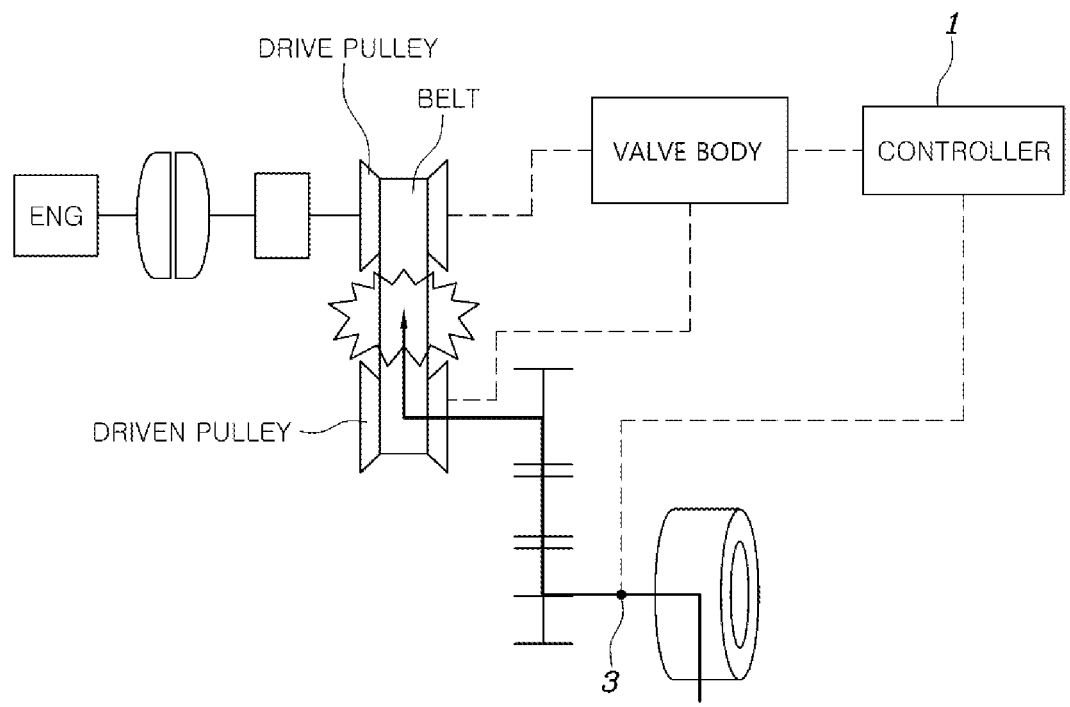
FIG. 1 is a drawing showing the power train configuration of a continuously variable transmission vehicle applicable to an exemplary embodiment of the present invention and explaining the operation by the impact force applied to a belt pulley.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION OF THE DISCLOSURE

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a belt pulley control method of a continuously variable transmission according to an exemplary embodiment of the present invention will be described with reference to the attached drawing.

A belt pulley control method of a continuously variable transmission (CVT) according to an exemplary embodiment of the present invention is a method to prevent the belt pulley from being damaged by the rapid friction coefficient fluctuation of the road surface using the output shaft speed inside the CVT.

Figure 2:
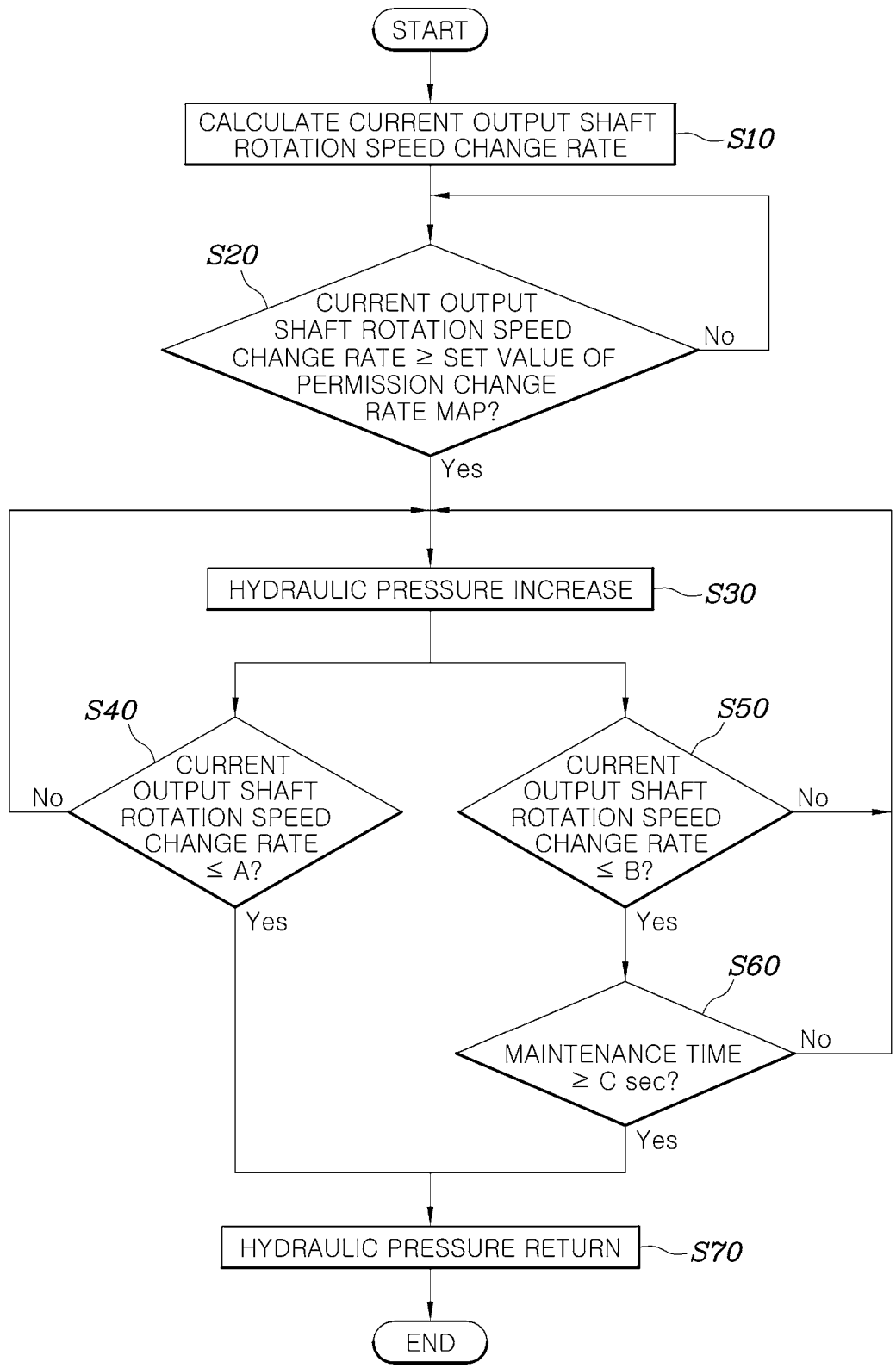
FIG. 2 is a flowchart showing the belt pulley control process according to an exemplary embodiment of the present invention.

Referring to FIG. 1 and FIG. 2, the present invention may include a step of setting, by a controller 1, a permission change rate map by adding a predetermined margin to the output shaft rotation speed change rate of a normal road surface, which is determined by the relationship between an opening amount of an APS (Accelerator Pedal Sensor) and a vehicle speed in an high friction road condition and a step of controlling, by the controller 1, a hydraulic pressure of the belt pulley to be raised when the output shaft rotation speed change rate of the current vehicle is equal to or greater than a set value of the permission change rate map.

Herein, the output shaft rotation speed change rate may be obtained by measuring and determining through an output shaft speed sensor 3 provided in the transmission.

That is, the value of the output shaft rotation speed change rate (rpm/s) may be secured by the relationship between a throttle opening amount and the vehicle speed for normal road surface conditions such as asphalt roads or pavement roads. The present invention may secure the permissible output shaft rotation speed change rate as the output shaft rotation speed change rate of the normal road surface by experiment or measurement to set a permission change rate map and set the set value as the upper limit value of the permission change rate map to the entry condition of logic.

Figure 3:
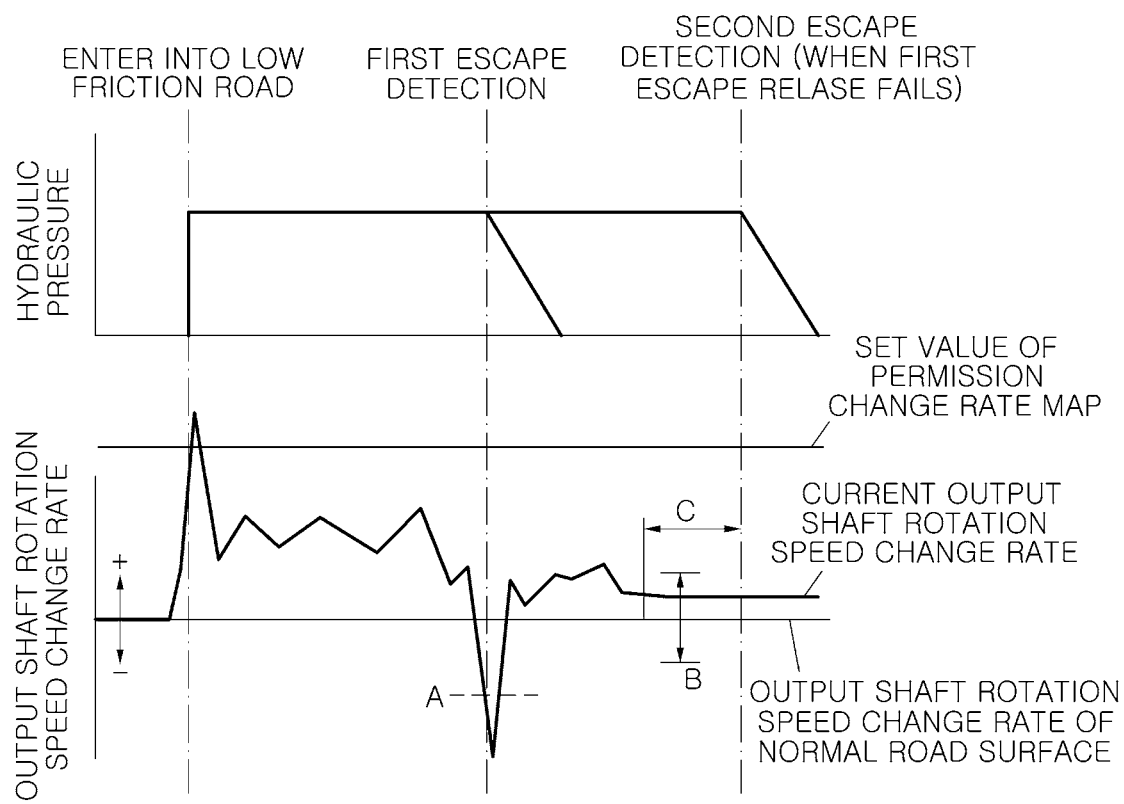
FIG. 3 illustrates the behavior of the output shaft rotation speed change rate according to an exemplary embodiment of the present invention and the resulting hydraulic control operation.

Thus, a wheel speed increases suddenly when wheel slip of tires occurs during the vehicle is running, as shown in FIG. 3, so that the output shaft rotation speed change rate (rpm/s) rises above the upper limit value of the permission change rate map, and thus, the controller 1 determines that the vehicle enters into low friction road (sand/snow road) to control the hydraulic pressure controlling the belt pulley to be raised to a set pressure.

Furthermore, as shown in FIG. 2 and FIG. 3, a step of controlling the raised hydraulic pressure of the belt pulley to return may be included when the current output shaft rotation speed change rate is equal to or lower than a lower limit value A which is equal to or lower than the set value of the permission change rate map after the hydraulic pressure is raised as described above in an exemplary embodiment of the present invention.

For example, the lower limit value A may be set to a value which is lowered by a predetermined value based on a set value of a safety rate up-control entry map.

As an exemplary embodiment of the present invention, the lower limit value A may be set to a value lowered by a predetermined value based on the output shaft rotation speed change rate of the normal road surface set according to the high friction condition road as a general vehicle road (asphalt, pavement road, etc.).

That is, when the vehicle enters the normal road surface having a relatively high friction coefficient while travels on the low friction road surface with wheels slip, the rotation of the tires is sharply reduced, so that the actual output shaft rotation speed change rate is lowered sharply. At the instant time, it is possible to enter the release condition of the logic depending on whether the actual output rotation speed change rate has fallen equal to or lower than the lower limit value A.

Furthermore, after the hydraulic pressure is increased as described, the present invention includes the step of controlling the raised hydraulic pressure of the belt pulley to return in the case that the current output shaft rotation speed change rate enters into a predetermined stabilization section included in the permission change rate map to be maintained for a predetermined time period C.

Herein, the stabilization section may be a section offset by a predetermined change rate based on the output shaft rotation speed change rate of the normal road surface and at least the offset change rate B will not exceed the set value of the permission change rate map and the lower limit value A.

That is, in the case that the current output shaft rotation speed change rate does not reach the lower limit value A described above or it is not detected to reach at the lower limit value A, if the current output shaft rotation speed change rate enters into the stabilization section as the output shaft rotation speed change rate section of the normal road surface condition for a predetermined time period C, the controller 1 controls the raised hydraulic pressure to return by determining that the vehicle is traveling normally off the low friction road.

Referring to FIG. 2, to explain the belt pulley control process according to an exemplary embodiment of the present invention sequentially, first the current output shaft rotation speed change rate of the vehicle as the relationship between the APS opening amount of the vehicle and the vehicle speed is detected at step S10.

The detected the current output shaft rotation speed change rate is compared with the permission change rate map stored in the controller 1 at step S20, when the current output shaft rotation speed change rate is equal to or greater than the upper limit value as the set value of the permission change rate map, the hydraulic pressure applied to the belt pulley is controlled to be raised at step S30.

Continuously, it is determined whether the current output shaft rotation speed change rate is equal to or lower than the lower limit value A at step S40. As a determination result, when it falls equal to or lower than the lower limit value, the raised hydraulic pressure is controlled to return to normal at step S70.

Additionally, after the step S30 or together with the step S40, it is determined whether the current output shaft rotation speed change rate has entered into the section of the change rate B offset by a predetermined value based on the output shaft rotation speed change rate of the normal road surface at step S50, and the holding time is equal to or longer than a predetermined time period C at step S60.

In an exemplary embodiment of the present invention, the lower limit value A may be lower than the change rate B.

As a determination result, the step S50 and the step S60 are all satisfied, the raised hydraulic pressure may be controlled to return to a normal value at step S70.

As described above, the present invention detects the sudden change of the friction coefficient of the road surface by the change level of the output shaft rotation speed change rate to control the hydraulic pressure of the belt pulley to be raised, so that it is possible to improve the robustness against the impact applied to the belt pulley and prevent the damage of the belt pulley and transmission, ensuring the reliability of the transmission product and further reducing the transmission quality problem in a region where the road surface condition is poor.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling a belt pulley in a continuously variable transmission, the method comprising:
    setting, by a controller, a permission change rate map by adding a predetermined margin to an output shaft rotation speed change rate of a normal road surface according to a predetermined road condition; and
    controlling, by the controller, a hydraulic pressure of the belt pulley to be raised when a current output shaft rotation speed change rate of a vehicle is equal to or greater than a first predetermined value of the permission change rate map.

2. The method of claim 1, further including:
    controlling, by the controller, the raised hydraulic pressure of the belt pulley to return to a normal value when the current output shaft rotation speed change rate falls equal to or lower than a second predetermined value after the hydraulic pressure is raised.

3. The method of claim 2, wherein the second predetermined value is a value which is lowered by a predetermined value based on the first predetermined value of the permission change rate map.

4. The method of claim 2, wherein the second predetermined value is a value which is lowered by a predetermined value based on the output shaft rotation speed change rate of a normal road surface.

5. The method of claim 1, further including:
    controlling, by the controller, the raised hydraulic pressure of the belt pulley to return to a normal value when the current output shaft rotation speed change rate is maintained for a predetermined time period in a state of entering into a predetermined stabilization section including the output shaft rotation speed change rate of the normal road surface after the hydraulic pressure is raised.

6. The method of claim 5, wherein the stabilization section is a section offset by a predetermined change rate based on the output shaft rotation speed change rate of the normal road surface.

7. The method of claim 1, further including:
    controlling, by the controller, the raised hydraulic pressure of the belt pulley to return to a normal value when the current output shaft rotation speed change rate is lower than or equal to a second predetermined value and is maintained for a predetermined time period after the hydraulic pressure is raised.

8. The method of claim 2, further including:
    controlling, by the controller, the raised hydraulic pressure of the belt pulley to return to a normal value when the current output shaft rotation speed change rate is lower than or equal to a third predetermined value and is maintained for a predetermined time period after the hydraulic pressure is raised.

9. The method of claim 8, wherein the second predetermined value is lower than the third predetermined value.

* * * * *